United States Patent [19]

Evans

[11] Patent Number: 4,848,453

[45] Date of Patent: Jul. 18, 1989

[54] TRANSMISSION COOLING DEVICE

[76] Inventor: Mark A. Evans, 2103 Spaulding, Boise, Id. 83705

[21] Appl. No.: 257,885

[22] Filed: Oct. 14, 1988

[51] Int. Cl.$^4$ .............................................. B60H 1/22
[52] U.S. Cl. .................................. 165/44; 74/606 A; 123/196 AB; 184/104.3
[58] Field of Search ............... 184/104.1, 104.2, 104.3; 165/41, 44, 51; 123/196 AB; 74/606 R, 606 A; 180/233, 68.1

[56] References Cited

U.S. PATENT DOCUMENTS

| | | | |
|---|---|---|---|
| 1,318,706 | 10/1919 | Talbot | 184/104.3 |
| 1,365,438 | 1/1921 | Adamson | 184/104.3 |
| 1,653,427 | 12/1927 | Beebee | 184/104.3 |
| 1,981,290 | 11/1934 | Spiegel et al. | 184/104.3 |
| 2,051,026 | 8/1936 | Booth | 184/104.3 |
| 2,062,509 | 12/1936 | Francisco et al. | 165/51 |
| 2,577,188 | 12/1951 | Hall | 184/104.2 |
| 3,809,175 | 5/1974 | Andrews | 168/44 |
| 3,817,354 | 6/1974 | Meiners | 184/104.3 |
| 4,022,272 | 5/1977 | Miller | 184/104.3 |
| 4,203,566 | 5/1980 | Lord | 165/41 |

FOREIGN PATENT DOCUMENTS 0302439 3/1920 Fed. Rep. of Germany ... 184/104.1
0480188 5/1925 Fed. Rep. of Germany ........ 165/44

*Primary Examiner*—Albert W. Davis, Jr.
*Assistant Examiner*—John K. Ford
*Attorney, Agent, or Firm*—Paul F. Horton

[57] ABSTRACT

A cooling device for cooling an automatic transmission by forcing air into heat transference with the transmission pan comprising a framework spaced below the bottom surface of the pan to provide a gap for the flow of air and a plurality of slats; each of the slats mounted to the framework at an upwardly inclined angle from front to rear transverse to the length of the pan and in parallel relationship with one another. Each of the slats is provided with an air intake opening, each opening being raised on successive slats from front to rear in "stair-step" fashion for maximum heat transference over the length of the pan. A pair of brackets are provided for mounting the device to existing pans or, in the alternative, the device may be unitary with the pan. The device is particularly useful on all vehicles having adequate ground clearance such as pickups, trucks, motor homes, and the like.

9 Claims, 1 Drawing Sheet

TRANSMISSION COOLING DEVICE

BACKGROUND OF THE INVENTION

1. Field of the Invention

This invention relates, in general, to transmissions, and, in particular to devices for cooling automatic transmissions by air cooling the transmission pan.

2. Description of the Prior Art

Over heating of the transmission is a common occurrence where transmission fluid is low; the load overburdening; the weather hot; or where a combination of these factors is present. Over heating often results in damage to the bands and seals of the transmission, rendering the transmission inoperable, and resulting in cost and time inefficiency to the owner or operator. To alleviate the problem, an additional fluid circulation radiator is often installed. This is often done with recreational vehicles or with vehicles used to pull travel trailers, stock trailers, and the like. While effective, the cost of the radiator, coupling tubes, and installation is often prohibitive. Additionally, such circulation type radiators are plagued by leaks in both the radiator and the coupling hoses.

In attempting to provide a solution to this problem, modular finned type radiators have been cemented to the bottom of transmission pans, as shown by B. Miller, U.S. Pat. No. 4,022,272. For cooling engine oil, pans have been developed with heat radiation fins, as shown by Meiners, U.S. Pat. No. 3,817,354; C. Adamson, U.S. Pat. No. 1,365,458; and W. E. Talbot, U.S. Pat. No. 1,318,706. The Talbot patent and U.S. Pat. No. 1,981,290, issued to E. Spiegel, show add-on lubrication chambers or radiators through which engine oil flows for cooling. Each of these prior art structures work by increasing surface area of the pans or the add-on units for increased heat transfer.

SUMMARY OF THE INVENTION

The present invention cools the transmission pan and hence the transmission fluid, by increasing air flow for dissipation of heat from the pan and also by increasing the effective surface area of the pan through heat conduction. For accomplishing this function, the transmission cooler of the present invention includes a framework positioned below and spaced from the transmission pan and a plurality of air deflection baffles or slats mounted to the framework transverse to the length of the pan and set at such an angle of inclination so as to increase the volume of air flow in heat transference contact with the pan. Successive slats from front to rear, relative to the pan, are provided with "stair-stepped" openings for maximizing volume of air flow and turbulence.

It is therefore a primary object of the present invention to provide a transmission cooling device which cools the transmission pan and hence the fluid by increasing the volume of air in contact with the pan.

It is also an object of the present invention to provide a transmission cooling device which is readily attached to an existing transmission without modification of the transmission.

Another object of the present invention is to provide a transmission cooling device which is cost efficient both as to production and as to installation.

More specifically, it is an object of the present invention to provide a transmission cooling device which includes a framework, spaced from a transmission pan and provided with a plurality of air deflection slats set at a selected angle across the width of the pan for scooping air into heat transference contact with the pan.

Even more specifically, it is an object of the present invention to provide a transmission cooling device which includes a plurality of slats spaced from a transmission pan, inclined, and parallel spaced from front to rear with successive slats provided with stair-stepped openings for conducting air to rearwardly spaced slats and for creating turbulence of the air contacting the transmission pan.

Additional objects and advantages will become apparent and a more thorough and comprehensive understanding may be had from the following description taken in conjunction with the accompanying drawings forming a pair of this specification.

DETAILED DESCRIPTION OF THE INVENTION

Figure 1:
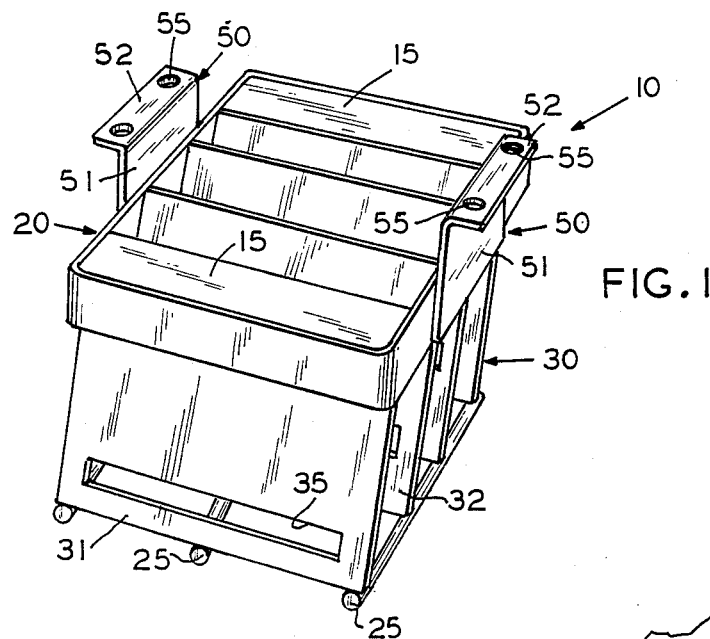
FIG. 1 is a perspective view of a preferred embodiment of the transmission cooling device of the present invention.
Figure 2:
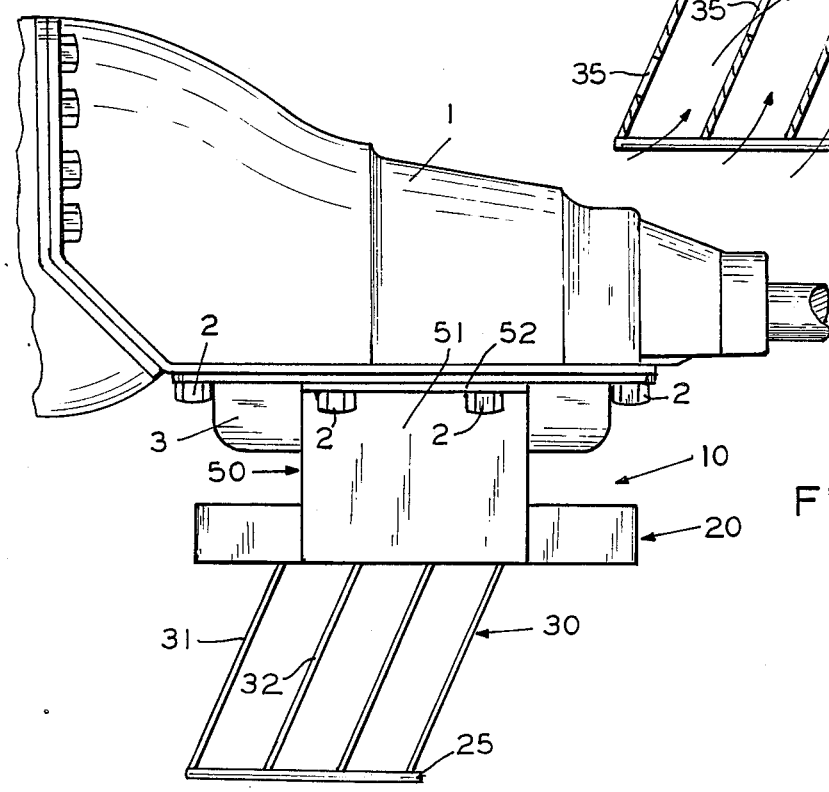
FIG. 2 is a side elevation showing the mounting of the device of FIG. 1 for a transmission.

Referring now to the drawings, and to FIGS. 1 and 2 in particular, an embodiment to be preferred of a transmission cooling device 10 made according to the present invention is disclosed. Device 10, as shown, includes a framework 20; a plurality of air baffles or slats 30, designated generally by the numeral 30; and a pair of mounting brackets 50.

Framework 20 is constructed of any suitable material such as twenty gauge sheet metal and is preferably rectangular in shape. The size of the framework is dependent upon the size of the transmission pan. It has been found that a framework twelve inches in length; eleven and one-half inches in width; and having a depth of one and one-half inches is adequate for most automobile automatic transmissions.

For attachment of the framework to transmission 1, a pair of mounting brackets 50, constructed of slightly heavier material, as for example, sixteen gauge sheet metal, are welded or otherwise affixed to opposing sides of the framework. Each of the mounting brackets is substantially L-shaped in configuration, preferably having an upwardly extending side member 51 and a top flange 52 bent at right angles to the side member. The side members on the embodiment shown are six inches in length; three and three-quarters inches in height and each of the top flanges is of equal length and three-quarters inch in width. The brackets are each attached to the framework so that the framework will be about one-half inch below the bottom of transmission pan 3, parallel with the pan. For mounting the brackets and hence device 10 to the transmission, each flange is provided with a pair of laterally spaced holes 55 formed or machined into the flange so as to be in registry with bolts 2. Bolts 2 are a part of the transmission and used to fasten pan 3 to transmission 1. The bolts are simply removed from the transmission and then inserted first through holes 55 of brackets 50 and then through the holes of the pan for threadably engaging the transmission housing to hold device 10, as well as pan 3, in place.

To assure the integrity of the framework structure and the slats and for forcing more air into contact with rearward slots, as will hereinafter be explained, the framework is provided with a pair of spaced members 15 mounted across the top front end and rear ends of the framework, as shown in FIG. 1. The spacer members provide stability to the framework in providing an edge for welding framework. The front spacer is important in causing a pressure build up for forcing greater volume of air through the slot of first slat 31. Also, to hold slats 30 in alignment and in parallel relationship to one another, a selected number of stability rods 25 may be affixed to the sides and bottom of the slats, running lengthwise to the framework.

Slats 30, in the preferred embodiment, are constructed of twenty gauge sheet metal and are eight inches in height and eleven and one-half inches in length, extending across the width of and welded to framework 20. While the number of slats may vary, in the embodiment shown, four slats are used and it is contemplated that four slots will accommodate most transmissions. The slats are mounted parallel to one another at a front to rear and bottom to top inclination of approximately thirty five degrees relative to framework 20 and hence to the bottom surface of transmission pan 3, thus serving as air scoops to force a much greater volume of air into heat transference contact with the pan. Each slat, with the possible exception of the last, rearwardmost slat, is provided with an elongated slot 35 extending across the substantial width of the slat, terminating approximately one inch from the respective ends of the slat. Each slot is approximately one inch in height and, in successive slats from front to rear of the device, the slots are "stair-stepped"; the slots on successive slats being graduated upward one-half inch above the slot on the adjacent forward slat. Slat 31 has a slot located one inch from the bottom edge; slat 32 has a slot located two and one-half inches from the bottom edge, etc. The slots serve to conduct air to successive rearwardly mounted slats where the air, because of the inclination of the slats, is then forced upwardly into heat transference contact with the bottom surface of the pan and the slots are also operable, in cooperation with spacers 15, to cause air turbulence to prevent "layering" of the air in its flow past and in contact with the transmission pan.

Figure 3:
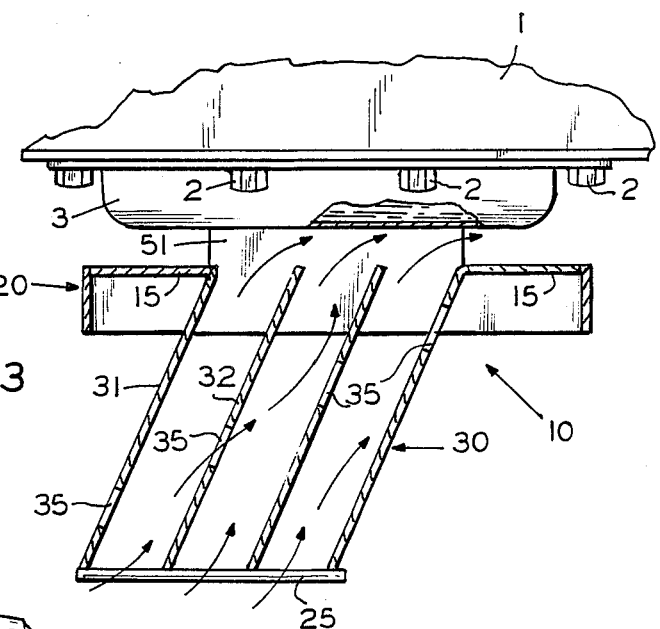
FIG. 3 is a sectional view of a second embodiment showing the device being unitary with the transmission pan.

It will be obvious that device 10 may be made unitary with the transmission pan, as shown in FIG. 3, by simply eliminating the bracket flange 52 and welding or otherwise securing the bracket side member 51 directly to the pan so as to appropriately space the framework 20 from the under surface of the pan.

Having thus described in detail preferred embodiments of the present invention, it is to be appreciated and will be apparent to those skilled in the art that many physical changes could be made in the apparatus without altering the inventive concepts and principles embodied therein. The present embodiments are therefore to be considered in all respects as illustrative and not restrictive, the scope of the invention being indicated by the appended claims rather than by the foregoing description, and all changes which come within the meaning and range of equivalency of the claims are therefore to be embraced therein.

I claim:

1. A transmission cooling device comprising:
   a framework space a selected distance below a vehicular transmission pan; and
   a plurality of slats mounted to and downwardly depending from said framework transverse to the length of the pan and each slat set at a selected angle of inclination from bottom to top for scooping air into heat exchange contact with the pan.

2. The device as described in claim 1 wherein each of said slats, except the rearwardmost slat, is provided with an elongated opening for conducting air therethrough.

3. The device as described in claim 2 wherein the opening of each successive slat, from front to rear, is graduated upwardly.

4. The device as described in claim 1 wherein each of said slats is parallel with an adjacent slat.

5. The device as described in claim 1 further comprising slat bracing means for holding said slats in a fixed relationship with one another.

6. The device as described in claim 1 further comprising a pair of mounting brackets affixed to and upwardly extending from said framework on opposing sides thereof, each of said brackets defining bolt holes in registry with bolt holes in the transmission pan for receiving the pan bolts for securing the framework to the pan.

7. A transmission cooling device comprising:
   a framework mounted a selected distance below a vehicular transmission pan; and
   a plurality of slats mounted to and downwardly depending from said framework in parallel relationship with one another and transverse to the length of the pan; each slat set at a selected angle of inclination from bottom to top for scooping air into heat exchange contact with the pan; and each slat, except the rearwardmost slat, provided with an elongated, laterally extending, opening; the openings of each successive slat from front to rear being graduated upwardly.

8. The device as described in claim 7 further comprising a pair of mounting brackets affixed to and upwardly extending from said framework on opposing sides thereof, each of said brackets defining bolt holes in registry with bolt holes in the transmission pan for receiving the pan bolts for mounting the framework to the pan.

9. The device as described in claim 7 wherein said cooling device is unitary with the transmission pan.

* * * * *